United States Patent [19]
Hubert

[11] Patent Number: 6,129,478
[45] Date of Patent: *Oct. 10, 2000

[54] LOCKING MECHANISM

[75] Inventor: Ronald M. Hubert, Yardley, Pa.

[73] Assignee: Quest Diagnostics Incorporated, Teterborn, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/776,981

[22] PCT Filed: Jul. 24, 1996

[86] PCT No.: PCT/US96/12258

§ 371 Date: Feb. 3, 1997

§ 102(e) Date: Feb. 3, 1997

[87] PCT Pub. No.: WO97/04238

PCT Pub. Date: Feb. 6, 1997

[51] Int. Cl.[7] ....................................... F16B 2/00
[52] U.S. Cl. .......................... 403/322.3; 403/13
[58] Field of Search ..................... 403/373, 374, 403/375, 333, 334, 321, 322, 325, 13, 14, 374.1, 374.2, 374.5, 322.3, 322.1, 322.4

[56] References Cited

U.S. PATENT DOCUMENTS

| | | | |
|---|---|---|---|
| 2,494,159 | 1/1950 | Bernstein | 403/325 X |
| 3,369,265 | 2/1968 | Halberstadt | 403/334 X |
| 3,494,641 | 2/1970 | Caregnato | 403/322 X |
| 3,867,050 | 2/1975 | Pitner | 403/373 |
| 4,431,333 | 2/1984 | Chandler | 403/322 |
| 4,636,135 | 1/1987 | Bancon | 403/322 X |
| 4,859,117 | 8/1989 | Brandi et al. | 403/322 X |
| 4,867,595 | 9/1989 | Hoffman | 403/322 X |
| 5,253,944 | 10/1993 | Preston | 403/13 |

*Primary Examiner*—Harry C. Kim

[57] ABSTRACT

A locking mechanism for releasably locking together a first apparatus and a second apparatus is provided and having a first docking device on the first apparatus to which a second docking device on the second apparatus mates when the apparatuses are brought together, the first docking device having one or more engagement projections extending therefrom, the second docking device having a number of receiving cavities corresponding to the number of engagement projections into which the engagement projections are received when the first and second docking positions are brought together.

4 Claims, 1 Drawing Sheet

LOCKING MECHANISM

FIELD OF THE INVENTION

This invention relates to a locking mechanism for releasably locking together a first apparatus and a second apparatus.

BACKGROUND OF THE INVENTION

It is frequently necessary to lock together two pieces of apparatus in an accurate relationship to each other whilst allowing the two pieces of apparatus to be unlocked and separated when required, and subsequently brought together and locked together again, for example to allow one of the pieces of apparatus to be replaced or for maintenance. It is highly desirable that the locking and unlocking mechanism is both easy to operate and accurate, whilst being secure.

A particular application of this kind of locking mechanism is to conveyor belt systems. For example it may be necessary to lock handling or testing devices adjacent to the conveyor belt in an accurate position such that for example the handling or testing devices can accurately remove and replace, or otherwise handle, or test, articles on the conveyor. An example of this type of system is an automated clinical testing system, in which vials containing clinical samples for testing are transported by a conveyor, with automatic testing equipment adjacent to the conveyor. Such handling and testing devices are conveniently mounted on a mobile platform, table or trolley which can be moved adjacent to the conveyor, and then locked to the conveyor. It is therefore desirable to provide a locking mechanism which can easily be used with such a platform, table or trolley.

It is an object of this invention to provide a locking mechanism that achieves these desirable features.

SUMMARY OF THE INVENTION

According to a first form of this invention, a locking mechanism for releasably locking together a first apparatus and a second apparatus is provided, comprising:
- a first docking position on the first apparatus to which a second docking position on the second apparatus mates when the first and second apparatus are brought together,
- the first docking position having one or more engagement projections extending therefrom,
- the second docking position having a number of receiving cavities corresponding to the number of engagement projections, into which the engagement projections are received when the first and second docking positions are brought together,
- wherein each receiving cavity has two opposing tapering side walls, which taper from a wide end facing the first apparatus to a narrow end remote from the first apparatus, the relative dimensions of the engagement projections and the receiving cavities being such that as each engagement projection is received by a respective receiving cavity the engagement projection contacts both opposing tapering side walls of the cavity in which it is received and,
- the first and/or second apparatus being provided with urging means by which each engagement projection and the narrow end of the receiving cavity in which it is received are urged firmly together after the projection is received by the cavity and,
- clamping means whereby each engagement projection is releasably locked into place in the receiving cavity in which it is received.

According to a second form of this invention a locking mechanism for releasably locking together a first apparatus and a second apparatus is provided, comprising:
- a first docking position on the first apparatus to which a second docking position on the second apparatus mates when the first and second apparatus are brought together,
- the second docking position having one or more engagement projections extending therefrom,
- the first docking position having a number of receiving cavities corresponding to the number of engagement projections, into which the engagement projections are received when the first and second docking positions are brought together,
- wherein each receiving cavity has two opposing tapering side walls, which taper from a wide end facing the second apparatus to a narrow end remote from the second apparatus, the relative dimensions of the engagement projections and the receiving cavities being such that as each engagement projection is received by a respective receiving cavity the engagement projection contacts both opposing tapering side walls of the cavity in which it is received and,
- the first and/or second apparatus being provided with urging means by which each engagement projection and the narrow end of the receiving cavity in which it is received are urged firmly together after the projection is received by the cavity and,
- clamping means whereby each engagement projection is releasably locked into place in the receiving cavity in which it is received.

DESCRIPTION OF THE INVENTION

Figure 1:
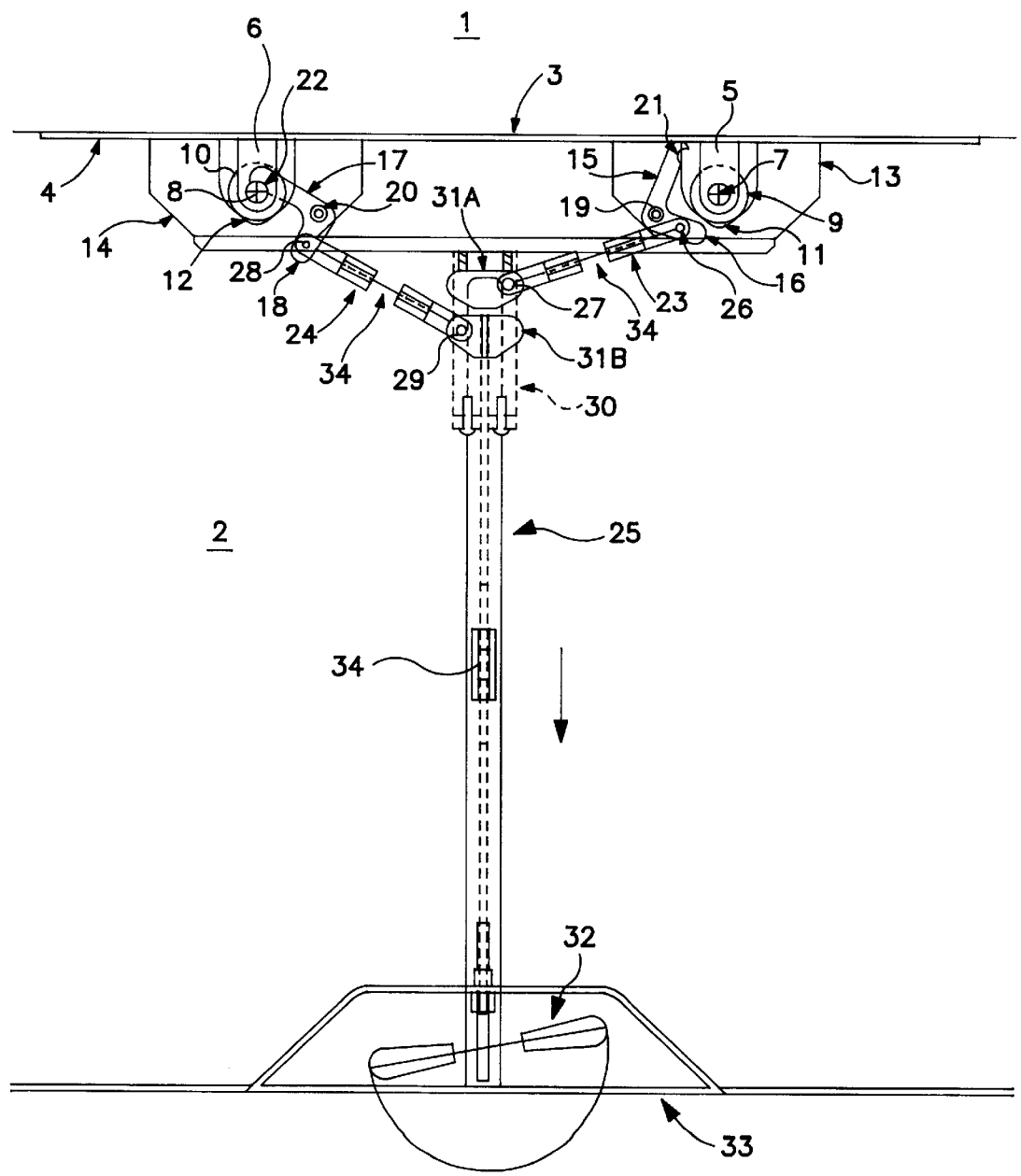
FIG. 1 shows a schematic plan view of a locking mechanism of the invention.

It has been found that the above described receiving of a projection by a receiving cavity provides accuracy in locking the first and second apparatus together and is additionally easy to use and robust against mechanical stress and shocks.

Generally the first form of the present invention is preferred.

In a preferred embodiment of this invention the first apparatus is a conveyor belt system, particularly a conveyor for transporting specimen vials on an automated clinical testing system, and the second apparatus is a platform, trolley or table which can be brought together with the conveyor. Testing or handling devices for testing the contents of vials on the conveyor, or otherwise handling the vials, may be mounted on the platform, trolley or table.

The first and second docking positions may be defined locations on such a conveyor and on such a platform, trolley or table which mate together so that the device(s) on the platform, trolley or table can accurately handle or test the vials on the conveyor or their contents.

Preferably there are two engagement projections at each docking position, as two such projections are found to provide particularly accurate mating of the first and second docking positions, by virtue inter alia of the inherent geometric linearity between two points. Preferably on a conveyor system the two or more projections and the corresponding receiving cavities are in a plane parallel to the plane of the conveyor, and to the plane of the above mentioned platform, trolley or table.

The engagement projections may have a variety of shapes. For example the distal end of the projection, i.e. the end remote from the docking position from which they project, may correspond generally in shape to the receiving cavity. Preferably the distal end is rounded, preferably having a part-circular shape. It is particularly preferred that such a rounded shape is achieved by means of the distal end of the engagement projection comprising a freely rotating wheel mounted on an axle. Preferably when the first or second apparatus is a conveyor system the plane of rotation of such a wheel is parallel to the plane of the conveyor and to the plane of the said platform, trolley or table. The spacing of the engagement projections in the said plane is selected to facilitate accurate mating of the first and second docking positions, and to provide robustness against stress and shock. A suitable spacing can easily be determined by simple experimentation for a particular application.

The receiving cavities may have a variety of tapering shapes. For example the shape may substantially correspond to the shape of the distal end of the engagement projection. A preferred tapering shape is a "V" shape, which may have a rounded point, or sides (e.g. to form an arched or ogival shape). When the distal end of the engagement projection is rounded, for example the above-described wheel, the plane of the V is preferably the plane of rotation of the wheel.

The limbs of the V comprise the opposing tapering side walls, and in the first form of the invention the point of the V is remote from the first apparatus. The dimensions of the V above described wheel are such that as the wheel is received in the V the rim of the wheel contacts both limbs of the V.

It is found that reception of the said wheel in such V shaped receiving cavities provides particularly accurate and robust mating.

Various urging means will be apparent to those skilled in the art to urge the distal end of the engagement projection firmly into the receiving cavity. For example screw thread action clamps attached to the first or second apparatus, in the preferred first form of the invention attached to the second apparatus, may engage the engagement projections and by screw action urge them firmly toward the narrow end of the receiving cavity. An urging means on the first or second apparatus may directly engage the structure of respectively the second or first apparatus to urge the engagement projection into the receiving cavity.

In a preferred embodiment, in the first form of the invention, the urging means is located on the second apparatus, and comprises a lever-action clamp. This may comprise two arms pivoted on a fulcrum between them, wherein a first arm is provided with an engagement means to engage the engagement projection, and a force applied to a second arm causes the arms to pivot such that the engagement means engages the engagement projection and transmits an urging force to the engagement projection. When the engagement projection comprises the above described wheel, the engagement means may conveniently engage with the axle of the wheel.

The said force may be applied to the second arm by a force applying means which may be a connecting rod or cable, which enables the force to be applied, conveniently by hand, from a position remote from the docking positions, via for example a conventional handle, lever turnable nut etc. Conveniently in the first form of the invention, when the first apparatus is a conveyor and the second apparatus is a platform, trolley or table as described above, the lever-action clamp(s) and receiving projections may be at one side of the platform, trolley or table, facing the conveyor, and such a connecting cable or rod may lead to a position at the opposite side of the platform, trolley or table, remote from the conveyor, facilitating use without obstruction by the platform, trolley or table or items thereon.

Various forms of clamping means will be apparent to those skilled in the art, whereby each engagement projection is releasably locked into place in the receiving cavity in which it is received. For example the structures of the first and second apparatus may be clamped together to achieve this.

In a preferred embodiment, in the first form of the invention, the clamping means is located on the second apparatus, and comprises the above described lever-action clamp. At the extremity of its urging action such a clamp may act to directly clamp the engagement projection into the receiving cavity. For example the clamp may be provided with a locking means whereby it may be locked into its extreme urging position such that it continues to exert an urging force upon the engagement projection. This may be achieved by known locking devices, for example by the releasable locking action of a threaded nut or a catch. The urging force may be maintained by tension, inherent elasticity, resilient means etc. in the clamp mechanism.

The invention will now be described by way of non-limiting example only with reference to the accompanying FIG. 1.

Referring to FIG. 1, a plan view of a locking mechanism of this invention is shown. A first apparatus 1 is shown schematically, and this can be a conveyor belt for transporting vials in an automatic clinical testing system. The conveyor belt moves in the plane of FIG. 1. A second apparatus 2 is also shown schematically, and this can be a wheeled table on which is mounted a testing or handling device (not shown) for testing samples contained in vials on the conveyor 1 or otherwise handling them, and which has been wheeled towards and against the conveyor belt 1.

On the side of the conveyor 1 is a first docking position 3, which is a defined location on the conveyor at which the vials may be handled and/or their contents tested. On the side of the table 2 which is against the conveyor 1 is a second docking position 4, which is a defined location on the table 2 which mates against the first docking position 3, such that when the first and second docking positions 3, 4 are mated as shown the device(s) on the table 2 can accurately handle or test the vials on the conveyor or their contents. The two docking positions 3, 4 in the embodiment illustrated have plane mating faces, but alternative constructions are possible and are within the scope of this invention.

Extending from the first docking position 3 are two engagement projections 5, 6. These comprise parallel supports in the plane of FIG. 1 for axles 7, 8 on which are mounted freely revolving wheels 9, 10. The plane of revolution of the wheels 9, 10 is the plane of FIG. 1.

At the second docking position 4 are two receiving cavities 11, 12. These are substantially "V" shaped with the "V" in the plane of FIG. 1, but with rounded corners, with the point of the "V" away from the conveyor 1. The cavities 11, 12 are formed in metal formers 13, 14 attached firmly to the table 2.

The engagement projections 5, 6 are received in their respective cavities 11, 12, with the wheels 9, 10 in contact with opposed tapering sides of the "V" shaped cavities 11, 12.

An urging means is provided in the form of a lever-action clamp comprising two sets of pairs of arms in an "L" shape 15, 16 and 17, 18 pivoted on a fulcrum 19, 20 between each pair. A first arm 15, 17 of each set is provided with an engagement means in the form of a cut-out 21, 22 corresponding in shape to the section of the axles 7, 8.

The second arm 16, 18 of each set is connected via a link 23, 24 to a connecting rod 25, with pivots being provided at 26, 27, 28, 29. The connecting rod 25 can move in a direction perpendicular to the conveyor 1, in a guide 30. By applying a pulling force to the connecting rod 25 in the direction of the arrow this force is transmitted to the second arms 16, 18 causing the first arms 15, 17 to pivot such that the cut-outs 21, 22 engage the axles 7, 8 and transmits an urging force to the wheels 9, 10 to urge the wheels 9, 10 firmly into the cavities 11, 12.

For clarity, arm 15 is shown disengaged with the axle 7, and the arm 17 is shown engaged with axle 8, whereas in practice both of the arms 15, 17 engage the axles 7, 8 simultaneously. Also the connection 31 between the links 23, 24 and the connecting rod 25 is shown in its two extreme positions, at 31A in the position it occupies before the pulling force is applied to the connecting rod 25, and at 31B at the position it occupies after the pulling force is applied. Also for clarity the pivot 27 is not shown at position 31B, and the pivot 29 is not shown at position 31A.

The said force may be applied manually to the connecting rod 25 via a handle 32, shown schematically. Handle 32 is at a position on the opposite side 33 of table 2 from the conveyor 1, so that it can be operated without interference with or obstruction by the table 2 or items thereon.

Adjustable tensioners 34 are provided at various points on the links 23, 24 and the connecting rod 25 to allow fine adjustment of the locking mechanism.

In use, with the table 2 disengaged from the conveyor 1, the handle 32 is operated so that the arms 15, 17 are in the position that arm 15 is shown in, in FIG. 1. The table is then presented to the conveyor 1 such that the docking positions 3, 4 mate, and the wheels 9, 10 are received in the cavities 11, 12 and abut against the tapering sides of the "V" shapes. The handle 32 is then operated so as to apply a pulling force to the connecting rod 25, and thereby move both arms 15, 17 into the position that arm 17 is shown in, in FIG. 1, so that the cut outs 21, 22 engage the axles 7, 8 and urge them firmly into the cavities 11, 12.

At the extreme end of their urging action against the axles 7, 8 the arms 15, 17 continue to apply an urging force against the axles 7, 8. Further operation of the handle 32 locks the handle 32 into a state in which there is pulling tension in the connecting rod 25, thereby clamping the wheels 9, 10 firmly into the cavities 11, 12.

To release the table 2 from the conveyor 1 the handle 32 is operated to as to release the pulling tension in the connecting rod 25, and then further to apply a pushing force in the opposite direction to that of the arrow in FIG. 1. This moves both arms 15, 17 into the position in which arm 15 is shown in FIG. 1, thereby allowing the wheels 9, 10 to be removed from cavities 11, 12 as the table 2 is moved away from conveyor 1.

What claimed is:

1. A two-part device for releasably locking together a first apparatus and a second apparatus, the two-part device comprising:
   a) a first part of the two-part device, adapted to extend from the first apparatus, said first part comprising two engagement projections wherein the distal end of each of said engagement projections is circular and comprise a freely rotating wheel mounted on an axle;
   b) a second part of the two-part device which is adapted to be disposed on the second apparatus, wherein each of said engagement projections of the first part of the two-part device engage releasably two receiving cavities of the second part of the two-part device, each receiving cavity having two opposing tapering side walls which taper from a wide end when facing the first apparatus to a narrow end remote from the first apparatus, the relative dimensions of the engagement projections and the receiving cavities being such that as each engagement projection is received by a respective receiving cavity the engagement projection contacts both opposing tapering side walls of the cavity in which it is received;
   c) the second part of the two-part device further comprising an urging means for urging firmly together said engagement projections and the narrow end of the receiving cavity after each of said projections is received by each of said receiving cavities, and;
   d) the second part of the two-part device additionally comprising clamping means, whereby each engagement projection is releasably locked into place in the receiving cavity in which it is received.

2. The device of claim 1 wherein the receiving cavities correspond in radius to the radius of the wheel mounted on the distal end of each engagement projection.

3. A method for releasably locking together a first apparatus and a second apparatus, comprising the steps of:
   a) providing a first docking mechanism disposed on the first apparatus wherein the first docking mechanism includes two separate engagement projections, further wherein the distal end of each of said engagement projections is circular and comprises a freely rotating wheel mounted on an axle attached to and extending from said first apparatus;
   b) providing a second docking mechanism, the second docking mechanism having two separate receiving cavities corresponding to the two engagement projections of the first docking mechanism;
   c) bringing the first apparatus and the second apparatus together, whereby the engagement projections of said first docking mechanism are received by said receiving cavities of the second docking mechanism when the first and the second apparatus are brought together, wherein each receiving cavity on the second docking mechanism has two opposing tapering side walls, which tapers from a wide end facing the first apparatus to a narrow end remote from the first apparatus, the relative dimensions of the engagement projections and the receiving cavities being such that as each engagement projection is received by a respective receiving cavity the engagement projection contacts both opposing tapering side-wall of the cavity in which it is received and, the second docking mechanism having an urging means by which each engagement projection and the narrow end of the receiving cavity in which it is received are urged firmly together after the projection is received by the receiving cavity and the second docking mechanism further including a clamping means; and
   d) engaging said clamping means, whereby each engagement projection of the first docking mechanism is releasably locked into place in each of the receiving cavities, in which each is received, of the second docking mechanism.

4. The method of claim 3 wherein said receiving cavities correspond in radius to the radius of said freely rotating wheel mounted on said distal end of each of said engagement projections.

* * * * *